United States Patent
Steinert (10) Patent No.: US 9,643,788 B2
(45) Date of Patent: May 9, 2017

(54) TOOTHED BELT (71) Applicant: BRECO Antriebstechnik Breher GmbH & Co., KG, Porta Westfalica (DE)

(72) Inventor: Thomas Steinert, Bad Oeynhausen (DE)

(73) Assignee: BRECO Antriebstechnik Breher GmbH & Co., KG, Porta Westfalica (DE)

(*) Notice: Subject to any disclaimer, the term of this patent is extended or adjusted under 35 U.S.C. 154(b) by 0 days.

(21) Appl. No.: 15/193,227

(22) Filed: Jun. 27, 2016

(65) Prior Publication Data

US 2017/0081124 A1 Mar. 23, 2017

(30) Foreign Application Priority Data

Sep. 23, 2015 (EP) .................... 15186508

(51) Int. Cl.
| | |
|---|---|
| B65G 39/20 | (2006.01) |
| B65G 15/60 | (2006.01) |
| B65G 17/24 | (2006.01) |
| B65G 15/42 | (2006.01) |

(52) U.S. Cl.
CPC ............ B65G 39/20 (2013.01); B65G 15/42 (2013.01); B65G 15/60 (2013.01); B65G 17/24 (2013.01)

(58) Field of Classification Search
CPC ........ B65G 15/42; B65G 15/60; B65G 15/62; B65G 17/24; B65G 21/22; B65G 39/20
USPC ...................................... 198/838
See application file for complete search history.

(56) References Cited

U.S. PATENT DOCUMENTS

| | | | | |
|---|---|---|---|---|
| 3,155,227 A * | 11/1964 | Wesson | ............... | B65G 21/22 198/834 |
| 5,042,647 A * | 8/1991 | Tyler | ............... | B65G 17/067 198/822 |
| 5,238,099 A * | 8/1993 | Schroeder | ............... | B65G 13/07 198/456 |
| 5,911,307 A | 6/1999 | Kraft et al. | | |
| 6,364,095 B1 * | 4/2002 | Layne | ............... | B65G 17/08 198/852 |
| 7,527,145 B2 * | 5/2009 | Zubair | ............... | B65G 17/08 198/837 |

(Continued)

FOREIGN PATENT DOCUMENTS

| | | |
|---|---|---|
| DE | 1149665 | 5/1963 |
| DE | 202007014761 | 2/2009 |

(Continued)

OTHER PUBLICATIONS

European Search Report of EP Application No. 15186508 dated Mar. 18, 2016, 5 pages.

Primary Examiner — Gene Crawford
Assistant Examiner — Keith R Campbell
(74) Attorney, Agent, or Firm — Rankin, Hill & Clark LLP (57) ABSTRACT

A toothed belt for transporting objects includes a strip-shaped belt body, which supports tooth profiles, which are molded on one side thereof and are arranged uniformly distributed in the longitudinal direction of the toothed belt. At least one tooth profile has at least one recess in which a support roller is arranged, the bearing surface of the support roller protrudes past the top face of the associated tooth profile for supporting the toothed belt.

14 Claims, 5 Drawing Sheets

(56) References Cited

U.S. PATENT DOCUMENTS

7,527,146 B2 * 5/2009 Stebnicki ............... B65G 17/24
 198/850
8,307,974 B2 * 11/2012 Saunders ................ F04B 19/20
 198/626.1

FOREIGN PATENT DOCUMENTS

DE 202012100232 2/2012
WO 03101865 12/2003

* cited by examiner

TOOTHED BELT

BACKGROUND

The invention relates to a toothed belt for transporting objects, having a strip-shaped belt body, which supports tooth profiles, which are molded on one side thereof and are arranged uniformly distributed in the longitudinal direction of the toothed belt.

BRIEF DESCRIPTION

A toothed belt of the type designated at the outset is known from the prior art and is described in DE 20 2012 100 232 U1. Such toothed belts are currently used in many cases not merely as traction drives but instead as highly precise conveying means for components in automated production. They are used thereby virtually as a precisely controllable, narrow conveyor belt. Transport devices of this type are then usually quite long, such that belt lengths of more than fifty meters are not unusual. The toothed belts are guided in the upper run in guide rails so that no sag is generated by loading with the products to be transported and no oscillations of the toothed belt arise in start-stop operation. Due to the weight loading of the components of the belt drive, but also due to the net weight of the belts, a normal load is generated on these guide rails which, in combination with the prevailing friction coefficient during movement, leads to a power loss. This power loss increases the drive output required and the energy consumption of the system. It also heats the toothed belts as a function of the belt lengths, the component weights, and the speeds so much that the service life of the toothed belts is significantly reduced, which is caused, by among other things, that the tensile strength of thermoplastic polyurethane as a material for toothed belts is strongly reduced in a way that is disproportionate to the increasing temperature.

The known solution approaches from the prior art are directed at reducing the friction coefficient between toothed belts and guide rails. On the rail side, polished stainless steel sheets and specific plastic materials with advantageous friction coefficients when in contact with polyurethane are currently used. On the belt side, fabric coatings are used on the tooth profile side which do indeed reduce the friction coefficient in the new state; however, due to wear, they have a chronologically limited efficiency. In sum, these potential measures are not satisfactory, because at higher speeds, loads, and operating temperatures, the system fails. Additional disadvantages include that the wear on fabric and guide rails is disruptive in the food industry, because contamination of the food with rub-off cannot be excluded.

To prevent these known disadvantages, it is known from the prior art to switch to sliding and rolling friction, insofar as the surface contact pressures prevailing in Hertz contact stresses occur.

Correspondingly, devices are known from other transport areas in which the roller element is integrated into the stationary part (for example, roller bearings or rollers in guide rails). For example, DE 20 2007 014 761 U1 describes a system in which a belt is supported and guided with the aid of slide rails and support rollers.

However, in the case of toothed belts, the toothing represents a problem such that the known measures from the prior art are not transferable. In order to avoid tooth engagement impacts, either a lot of narrow support rollers would have to be arranged in the guide rails offset across the width so that each tooth profile is always supported by a support roller somewhere on the belt width and belt length; or smooth, toothless longitudinal tracks would have to be provided on the toothed belts in which multiple (at least two) narrow support rollers, similar to roller-bearings, extend across the width and ensure support. Both possibilities are, however, expensive and burdened by technical compromises.

Starting from the known prior art, the underlying object of the invention is to create a solution which provides an improved toothed belt for transporting objects in a structurally simple way, which avoids the known problems from the prior art, and provides a potential for effective support of the tooth profile side of a toothed belt.

In a toothed belt of the type designated out the outset, the problem is solved according to the invention in that at least one tooth profile has at least one recess in which a support roller is arranged, the bearing surface of the support roller protrudes past the top face of the associated tooth profile for supporting the toothed belt.

Advantageous and appropriate embodiments and refinements of the invention arise from the subclaims.

Due to the invention, a toothed belt is provided which features a functional structure. In contrast with the known prior art, according to the invention, the rolling element, in the form of the support roller, is integrated into the moving part, the toothed belt. The support rollers integrated in the tooth profiles support the toothed belt on guide rails of a transport system and prevent oscillations during starting and stopping of the toothed belt. In addition, the support provided by the support rollers reduces the friction losses so that the toothed belt according to the invention requires a lower operating power than the systems known from the prior art, in which the belt is supported and guided in a rail using friction. The approach according to the invention integrates support rollers in the toothed belts, via which the toothed belt is supported and moved in a rolling way, additionally increases the service life of the toothed belt as, due to the roller friction, the toothed belts are no longer heated in such a way as is the case for belts which are guided in guide rails via sliding friction. In particular, using the embodiment of the toothed belt according to the invention, an expensive support of the tooth profile side by means of multiple, stationary rollers fixed on the guide rails is omitted. As the respective recesses weaken the tooth profile and thus the toothed belt, the recesses are designed with the support rollers arranged therein, at least in some of the tooth profiles, whereby it is also conceivable to design each tooth profile with a recess and a support roller functioning as a support. Naturally, the invention also includes embodiments in which either each tooth profile or each nth (whole number multiple, for example, each second, third, fourth, etc.) tooth profile may have more than one recess. The number of recesses and thus the support rollers per tooth profile may be selected as a function of the belt width, so that it is completely logical to provide broader belts with multiple support rollers per tooth profile.

A structurally advantageous possibility for integrating a respective support roller in a tooth profile consists in configuring the invention so that the at least one recess divides the associated tooth profile into tooth profile sections with respect to the width direction of the toothed belt, wherein the support roller associated with the recess is rotatably retained in the adjoining tooth profile sections of the associated tooth profile.

For reasons of the stability of the tooth profile, it is advantageous in the configuration of the invention that a respective support roller protrudes at a maximum of one-third of its radius past the top face of the associated tooth profile. In particular, a respective support roller protrudes exclusively past the top face and not past the flanks of the associated tooth profile so that the support roller compensates at least materially for the weakening of the tooth profile as a result of the recess. In addition, due to the low protrusion of a respective support roller past the associated top face, the expense for adjusting the toothed gear is low. This is because the toothed belt with a T-profile rides on the toothed gear via a tooth gap in the belt, thus the tooth crown of the belt does not lie in the gear. The amount of air present is greater than the protrusion of the support rollers protruding from the tooth profile from below, so that a completely normal standard toothed gear may be used. In contrast, a toothed belt with an AT profile rides via the tooth crowns. If each second tooth profile is equipped with a support roller, then in this case the gap base of the toothed gears have to be adapted such that a cylindrical section is made available in each second gap base into which the support roller immerses.

In order to keep the recess, which represents a weakening of the tooth profile, as low and small as possible, the invention provides in one embodiment that a respective recess in an associated tooth profile has a cross-sectional shape which is shell-shaped and corresponds in sections to the contour of the adjoining tooth profile sections in the width direction of the toothed belt, and extends up to the belt body. The shell-shaped contour is thereby adapted in particular to the bearing surface of a corresponding support roller.

According to one embodiment of the invention, a possibility exists for a rotatable retaining of a support roller in that a respective support roller is rotatably mounted via an axle fixed in the associated tooth profile. In this case, the support roller subsequently rotates around the axle fixed in the tooth profile.

In such an embodiment, it is then advantageous if one first longitudinal end of the axle is fixed in a tooth profile section of an associated tooth profile via a thread connection, and a second longitudinal end of the axle is fixed in a press-fit connection in the other tooth profile section of the associated tooth profile. The axle may hereby be implemented as a screw on one side, and correspondingly be screwed into a tooth profile section to prevent an axial slipping out of the axle.

According to another embodiment of the invention, a possibility exists for rotatable retaining of a support roller in that shaft stumps are molded on the ends on a respective support roller, each functioning for rotatable mounting, wherein the tooth profile sections each have a snap-in connection for accommodation and rotatable mounting of an associated shaft stump. In this embodiment, the axle is omitted and thus one component, as a respective support roller is designed with two shaft stumps which take on the mounting function. As the forces always act in the pressure direction, the mounting in the toothed belt may be configured as open snap-in connections on the tooth side so that the shaft stumps only needed to be simply snapped in during assembly of the support rollers.

To keep the weakening of each tooth profile with the recess as low as possible, a configuration of the invention provides that the ratio of axial length of the respective support roller to the belt width is at least 0.1 and at most 0.65. In the case of mounting the support roller by means of a respective axle, it has proven particularly advantageous if the ratio of axial length of a respective support roller to the belt width is 0.2, whereas in contrast, when mounting by means of the shaft stumps, a ratio or axial length of a respective support roller to the belt width of 0.6 has proven advantageous.

To be able to use the toothed belt according to the invention as an endless belt, the invention provides in another embodiment that the longitudinal ends of the toothed belt have comb-like stamped fingers designed complementary to one another, which define a predetermined stamped image and are arranged engaging with one another and are welded to one another to form an endless belt, wherein the stamped image extends in the longitudinal direction of the toothed belt across at least two tooth profiles with support rollers.

In general, the toothed belt is preferably made of polyurethane, wherein the belt body has longitudinal reinforcing strands, which may be made of wire, which in any case run below a respective support roller. Alternatively, it is also conceivable that the reinforcing strands run exclusively laterally adjacent to a respective support roller, by which means it is possible to mold the recesses very deep into the belt body.

In particular in the case of narrow toothed belts, it has proven advantageous that the support rollers arranged in the recesses are arranged aligned behind one another in the longitudinal direction of the toothed belt, which enables a quiet operation of the toothed belt.

To prevent oscillations in start-stop operation of the toothed belt, it has proven advantageous if at least one recess accommodating a support roller is designed in every second tooth profile of the toothed belt. By this means, a support of the toothed belt is guaranteed without sag.

Alternatively to an aligned arrangement of the profiles with the support rollers arranged therein, the invention provides that the support rollers arranged in the recesses of adjacent tooth profiles in the longitudinal direction of the toothed belt may be arranged offset to one another in the width direction. It is thereby irrelevant whether one or more recesses are arranged in each tooth profile or every second or third tooth profile. It depends only on the fact that the support rollers in adjacent tooth profiles are arranged offset to one another.

In order to exclude sag of the toothed belt in every case, the invention advantageously provides that at least one recess accommodating a support roller is designed in each tooth profile of the toothed belt.

Finally, the invention provides in another embodiment that at least one support roller is designed as convex when viewed in an axial section. The support rollers may thus have a slight barrel shape if they are designed as convex in the axial section. The convex shape has the advantage that, in comparison to a purely cylindrical cross sectional shape of the support roller, it causes less friction and is less susceptible to edge wear. Naturally, support rollers may also be used which are designed as trapezoidal in the axial section. It is also conceivable that a mixture of purely cylindrical and convex support rollers may be used in one toothed belt.

It is understood that the features previously indicated and subsequently to be explained may be used not only in the combinations indicated, but also in other combinations or alone without exceeding the scope of the present invention. The extent of the invention is only defined by the claims.

Additional details, features, and advantages of the subject matter of the invention arise from the subsequent description in connection with the drawings in which exemplary preferred embodiments of the invention are depicted.

DETAILED DESCRIPTION

Figure 1:
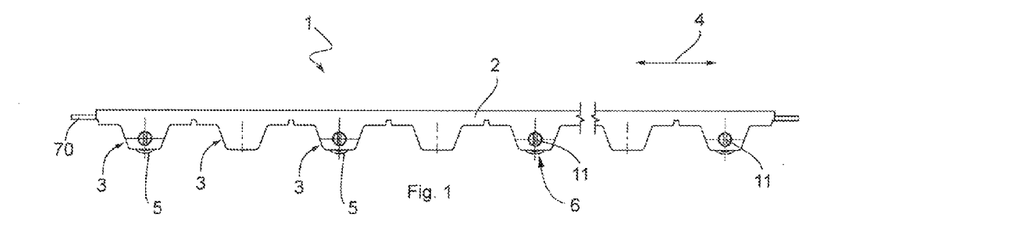
FIG. 1 shows a side view of one section of a toothed belt according to the invention.
Figure 2:
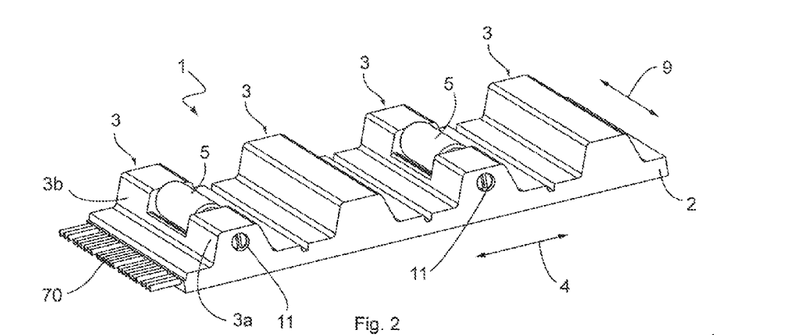
FIG. 2 shows a perspective view of one section of a toothed belt according to the invention.
Figure 11:
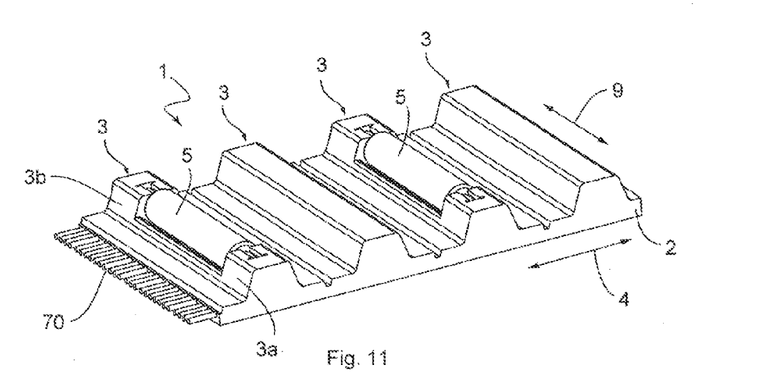
FIG. 11 shows a perspective view of one section of a toothed belt according to the invention with an alternative possibility for mounting the support rollers.

FIGS. 1 through 21 show a toothed belt 1 according to the invention or sections and different views of such a toothed belt 1 in a schematic way. Toothed belt 1 according to the invention has a strip-shaped belt body 2 which supports tooth profiles 3 molded on one side thereof, the tooth profiles are arranged uniformly distributed in the longitudinal direction 4 of toothed belt 1. Toothed belt 1 according to the embodiments shown in the figures is characterized in that at least one support roller 5 is integrated into a plurality of tooth profiles 3, or even into each of tooth profiles 3, the running surface 6 of the support rollers protrudes past top face 7 of associated tooth profile 3 (see, for example, FIG. 4), thus, toothed belt 1 may be supported via support rollers 5 on a guide rail, not shown in the figures. As is clear, for example, from FIGS. 2, 11, and 19, a support roller 5 is integrated into each second tooth profile 3 of toothed belt 1, wherein two support rollers 5 are even incorporated in one tooth profile 3 in the embodiment according to FIG. 19. One support roller 5 may naturally also be incorporated into each tooth profile 3, as is shown, for example, in FIG. 20. However, embodiments are also conceivable in which a support roller 5 is integrated into only each third or fourth, or each nth, i.e. multiples of whole numbers, tooth profile 3 to support toothed belt 1. It has proven advantageous to integrate a support roller 5 into at least each second tooth profile 3.

FIGS. 1 through 10 show in a schematic way a toothed belt 1 in which a first principle is used for a possible mounting of support rollers 5; in contrast, FIGS. 11 through 18 show a toothed belt 1 which has another principle for a possible mounting of support rollers 5. Stated more precisely, the mounting of support rollers 5 in the embodiment shown in FIGS. 1 through 10 follows the principle of an axle; in contrast, in the embodiment shown in FIGS. 11 through 18, the mounting is carried out according to the principle of a shaft.

With respect to FIGS. 1 through 10, each second tooth profile 3 has a respective recess 8 (see, for example, FIG. 7 or 9), which is designed centered in an associated tooth profile 3 with respect to width direction 9 of toothed belt 1 and in which recess a corresponding support roller 5 is arranged. Each recess 8 consequently divides associated tooth profile 3 into tooth profile sections 3a and 3b, in which associated support roller 5 is rotatably retained. A respective recess 8 thereby has a shell-shaped contour, wherein sections 8a, 8b running in width direction 9 follow the cross-sectional shape of tooth profile sections 3a, 3b at least in sections, or correspond to sections of the original tooth profile 3, as is clear, for example, in FIG. 5, which shows a section along line B-B in FIG. 3. As is likewise clear in FIG. 3, recess 8 in the embodiment shown extends into belt body 2 and ends just above longitudinally-extending reinforcing strands 70 such that these also run in the region of support rollers 5. Naturally, modifications of this embodiment are also possible in which no reinforcing strands 70 are arranged in the region beneath support roller 5 so that recess 8 may extend even deeper into belt body 2.

Figure 3:
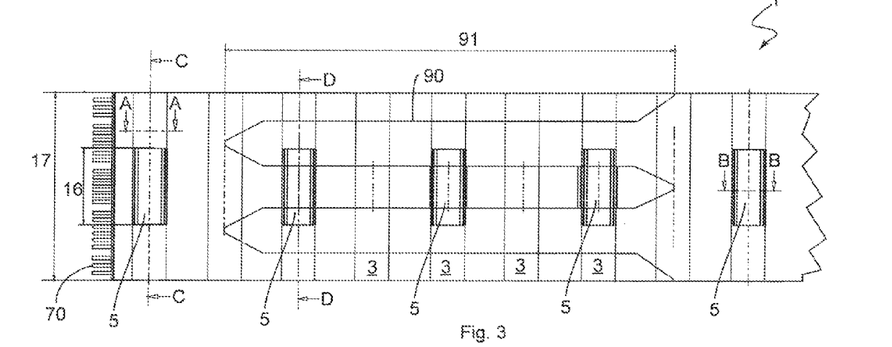
FIG. 3 shows a top view of one section of a toothed belt according to the invention.
Figure 4:
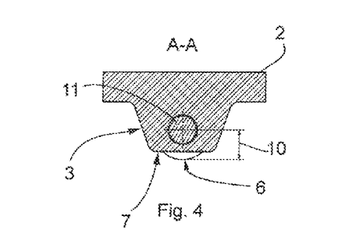
FIG. 4 shows a side view of the toothed belt along line A-A in FIG. 3.
Figure 5:
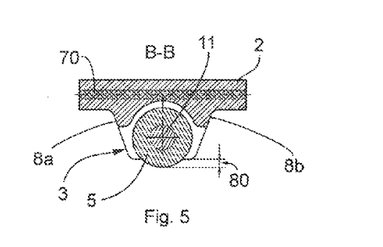
FIG. 5 shows a side view of the toothed belt along line B-B in FIG. 3.
Figure 6:
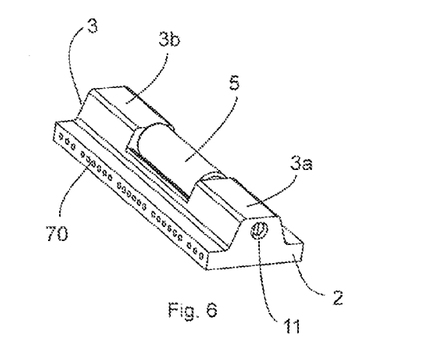
FIG. 6 shows a perspective view on a section of the toothed belt with the support roller mounted in a tooth profile.

A respective support roller 5 protrudes at a maximum of one-third (see FIGS. 4 and 5 regarding this) of radius 10 thereof past top face 7 of associated tooth profile 3, as is clear, for example, in FIG. 4, which shows a section along line A-A in FIG. 3, which in turn is a top view of a section of toothed belt 1 according to the invention. Excepting this protruding section of bearing surface 6, which is designated in FIG. 5 with reference numeral 80, support rollers 5 are completely accommodated within the cross-sectional shape of respective tooth profile 3 or cross-sectional shape of associated tooth profile sections 3a, 3b, so that only the protruding section 80 of respective bearing surface 6 of associated support roller 5, protruding past top face 7 of respective tooth profile 3, comes into contact with a guide rail to support toothed belt 1.

According to the embodiment shown FIGS. 1 through 10, a respective support roll 5 is rotatably mounted via an axle 11 fixed in associated tooth profile 3. For this purpose, tooth profile sections 3a, 3b have boreholes 12a, and 12b which accommodate the longitudinal ends of axle 11. Axle 11, which may be made of steel, is configured as a screw with a thread section 11b on a first longitudinal end 11a so that axle 11 may be axially secured against slipping out of bore hole 12a. The diameter of the other borehole 12b is slightly smaller than the diameter of associated second longitudinal end 11c of axle 11. Consequently, first longitudinal end 11a of axle 11 is fixed in tooth profile section 3a of associated tooth profile 3 via a type of threaded connection 14; in contrast, second longitudinal end 11c of axle 11 is fixed using a press fit connection 15 in the other tooth profile section 3b of associated tooth profile 3.

Axle 11 used in this embodiment is a single part and corresponds virtually to a specialized screw with a long cylindrical pin. The accommodation of axle 11 in tooth profile section 3b in the form of borehole 12b may be implemented just like bore hole 12a as a through hole. More expensive to manufacture, however quite realizable, bore hole 12a might alternatively be implemented as a blind hole. However, the respective through holes 12a and 12b have the advantage in the embodiment shown that toothed belt 1 may be drilled from both sides and the chips may be better removed from bore holes 12a, 12b during the processing.

To keep the weakening of tooth profile 3 with a recess 8 as low as possible, a support roller 5 is designed as narrow, among other reasons, for the mounting principle via axle 11 according to FIGS. 1 through 10, wherein the ratio of axial length 16 of support roller 5 to belt width 17 in the embodiment shown is 0.4 (see, for example, FIG. 3), wherein ratios deviating from this are also possible; however, they should be at least 0.1.

The use of intermediate materials or intermediate bodies is conceivable to additionally minimize the friction between respective axle 11 and associated support roller 5. Consequently, small sliding bearings, miniature needle bearings, or antifriction coatings with a lubricating effect may be additionally provided to minimize friction losses between axle 11 and support roller 5.

As an alternative to the mounting principle of support roller 5 via axle 11, axle 11 might be omitted and support roller 5 might be designed instead as a skid. Such an alternative is, however, only logical if the material of the skid at the guide rail generates less friction than the material of toothed belt 1, which is preferably polyurethane.

Figure 12:
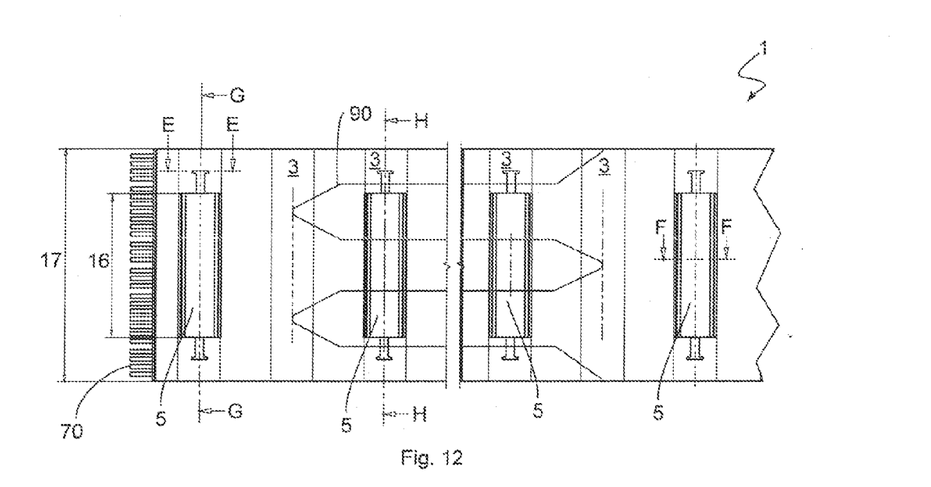
FIG. 12 shows a top view of one section of the toothed belt with an alternative possibility for mounting the support rollers.
Figure 13:
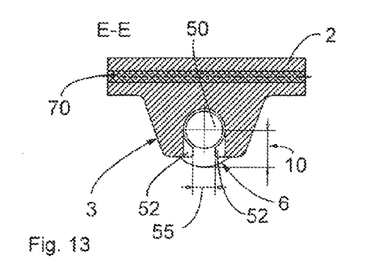
FIG. 13 shows a side view of the toothed belt along line E-E in FIG. 12.
Figure 14:
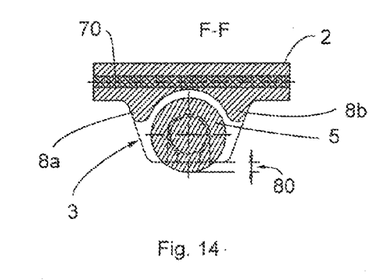
FIG. 14 shows a side view of the toothed belt along line F-F in FIG. 12.
Figure 15:
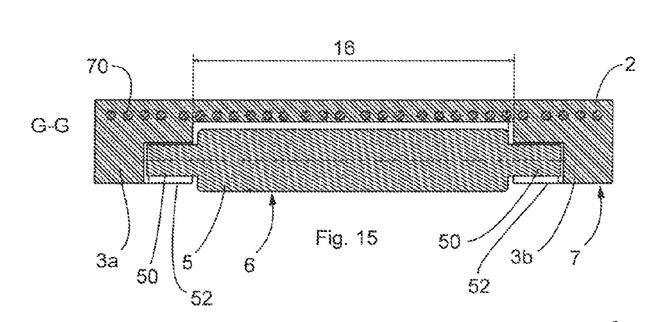
FIG. 15 shows a side view of the toothed belt along line G-G in FIG. 12.
Figure 16:
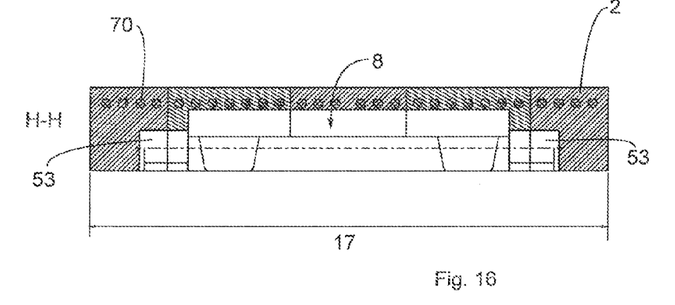
FIG. 16 shows a side view of the toothed belt along line H-H in FIG. 12 while omitting a support roller.
Figure 17:
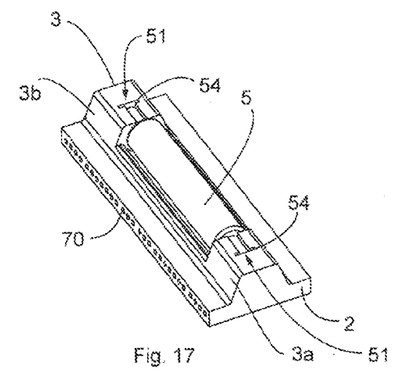
FIG. 17 shows a perspective view of one section of the toothed belt according to the invention with an alternative possibility for mounting the support rollers.

Another alternative to the mounting principle via axle 11 is shown in the embodiments of FIGS. 11 through 18. In this embodiment of toothed belt 1, which differs from the toothed belt of FIGS. 1 through 10 in the principle of the mounting of support roller 5, every second tooth profile 3 also has a respective recess 8 which is designed centered in associated tooth profile 3 with respect to width direction 9 of toothed belt 1 and accommodates corresponding support roller 5. A respective recess 8 also likewise divides associated tooth profile 3 into tooth profile sections 3a, 3b which rotatably accommodate associated support roller 5. A respective recess 8 likewise has in this embodiment a shell-shaped contour, wherein sections 8a, 8b running in width direction 9 follow the cross-sectional shape of tooth profile sections 3a, 3b at least in sections or correspond to sections of the original tooth profile 3, as FIG. 14, in particular, shows, which is a sectional view along line F-F in FIG. 12, which in turn is a top view of toothed belt 1. Recess 8 in a respective tooth profile 3 extends here as well into belt body 2 and ends just above longitudinally-extending reinforcing strands 70 (see, for example, FIG. 14). A respective support roller 5 likewise protrudes at a maximum of one-third of radius 10 thereof past top face 7 of associated tooth profile 3. Radius 10 is shown in FIG. 13, which shows a section along line E-E from FIG. 12. Excepting this protruding section 80 (see, for example, FIG. 14) of bearing surface 6, support rollers 5 are also completely accommodated within the cross-sectional shape of respective tooth profile 3 or the cross-sectional shape of associated tooth profile sections 3a, 3b, so that only protruding section 80 of respective bearing surface 6 of associated support roller 5, protruding past top face 7 of respective tooth profile 3, comes into contact with the guide rail.

As FIGS. 11 through 18 show for the additional embodiment, the mounting of support roller 5 is implemented according to the principle of a shaft. For this purpose, a shaft stump 50, functioning in each case for rotatable mounting, is molded at the ends on a respective support roller 5, as is clear, for example, from FIG. 18. During assembly, the two shaft stumps 50 are clipped into an associated snap-fit connection 51 which is molded in tooth profile sections 3a, 3b. Snap-fit connections 51 comprise elastically deformable retaining arms 52 which enable shaft stump 50 to be pressed into a respective accommodation space 53 which is designed in tooth profile section 3a or 3b. An intermediate space 55 is present between the two retaining arms 52, which are designed on respective tooth profile sections 3a, 3b, and intermediate space 55 is smaller than the diameter of associated shaft stump 50 so that a respective shaft stump is prevented from sliding out of corresponding accommodation space 53 after the assembly of associated support roller 5 on toothed belt 1. Additional slots 54, which extend into top surface 7 of tooth profile 3 in longitudinal direction 4 and limit retaining arms 52 in width direction 9, thereby ensure the elasticity of retaining arms 52. The embodiment according to the principle of shaft mounting uses one component less in comparison with the previously described embodiment (axle 11), wherein support roller 5 is implemented with two shaft stumps 50 to replace axle 11 and to take on the mounting function. As the forces affecting this mounting always act in the pressure direction, the bearing seat may be configured in the form of accommodation spaces 53 in toothed belt 1 as snap-fit connections 51 open on the tooth side. Shaft stumps 50 of support roller 5 simply need only be snapped in during assembly.

To improve the mounting of support roller 5 via shaft stumps 50, intermediate materials or intermediate bodies may be used to minimize the friction between shaft stumps 50 and accommodation spaces 53.

To keep the weakening of tooth profile 3 with recess 8 as low as possible, a narrow support roller 5 is provided for the mounting principle via shaft stumps 50 (according to the embodiment of FIGS. 11 through 18), wherein the ratio of axial length 16 of support roller 5 to belt width 17 in this case is 0.6 (see, for example, FIG. 12). Naturally, ratios deviating from this are also possible; however, they should be a maximum of 0.65.

Figure 19:
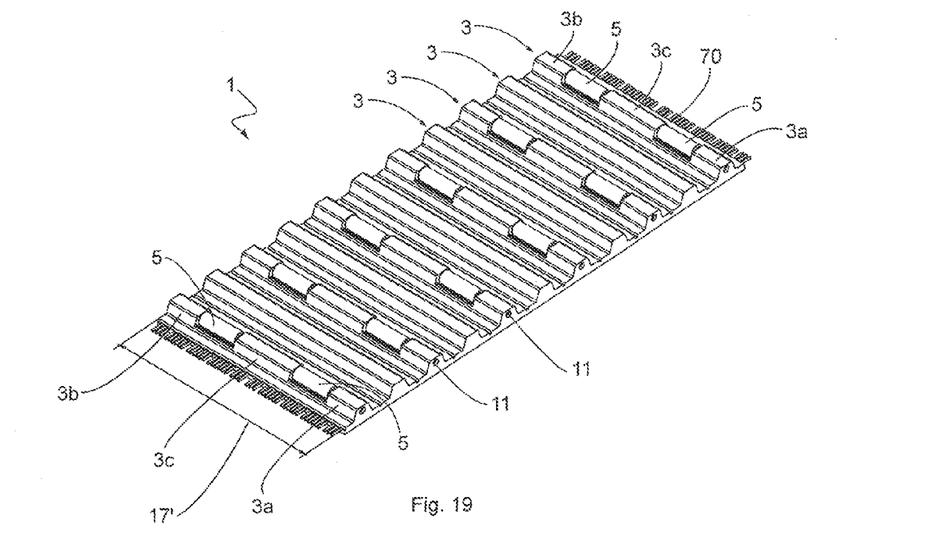
FIG. 19 shows a perspective view of an embodiment of the toothed belt according to the invention with two support rollers in one tooth profile.

FIG. 19 shows another possible embodiment of a toothed belt 1 in which support rollers 5 arranged in recesses 8 are arranged in two rows aligned behind one another in longitudinal direction 4 of toothed belt 1. In this embodiment, two recesses 8 with respective support rollers 5 lying adjacent to one another in width direction 9 of toothed belt 1 are provided in every second tooth profile 3, wherein, in this example, recesses 8 are only molded in each second tooth profile 3. Embodiments deviating from this are also conceivable in which two recesses 8 with support rollers 5 may be arranged in each tooth profile 3. The two recesses 8 divide tooth profile 3 into tooth profile sections 3a, 3b, 3c, wherein the two support rollers 5 per tooth profile are mounted and retained by a common axle 11. Axle 11 is fixed in tooth profile section 3a using a first longitudinal end which is designed as a screw, according to a type of screw connection, whereas the second longitudinal end of axle 11 is fixed using a press-fit connection in tooth profile section 3b. Axle 11 is held between the longitudinal ends thereof by tooth profile section 3c, which is arranged between the two support rollers 5 of an associated tooth profile 3. In the embodiment shown in FIG. 19, the ratio of axial length 16 of a respective support roller 5 (the axial length of support roller 5 in FIG. 19 is identical to axial length 16 of support roller 5 in FIG. 8) to belt width 17' is in this case 0.2. As modifications of the embodiment shown in FIG. 19, embodiments are conceivable in which at least two support rollers 5 are incorporated in each tooth profile 3.

Figure 20:
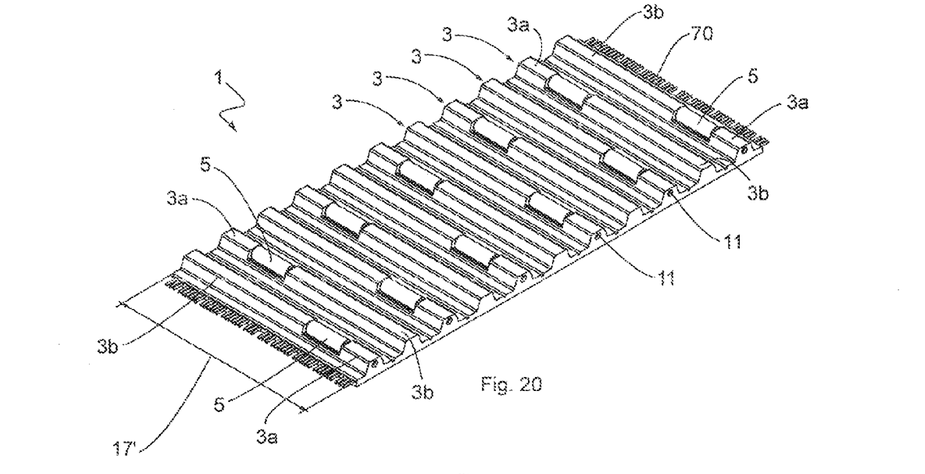
FIG. 20 shows a perspective view of an embodiment of the toothed belt according to the invention with support rollers offset from one another in the width direction.
Figure 21:
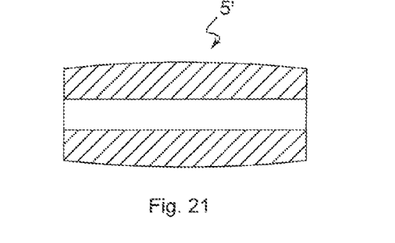
FIG. 21 shows a sectional view of a convex-designed support roller considered in an axial view.

FIG. 20 shows another modification, in which a recess 8 with a support roller 5 mounted therein is designed in each tooth profile 3. In contrast to the embodiment shown in FIG. 19, the support rollers integrated into tooth profiles 3 are no longer arranged in alignment. Instead, support rollers 5 arranged in recesses 8 of adjacent tooth profiles 9 are offset from one another in width direction 9 in such a way that support rollers 5 integrated into each second tooth profile 3 are arranged in alignment with one another in longitudinal direction 4.

It is understood that the embodiments shown in FIGS. 19 and 20, in which the mounting of a respective support roller 5 is implemented according to the principle of an axle, may also be transferred to the mounting principle of a shaft (see FIGS. 11 through 18). It is also possible to mix the mounting principles in one toothed belt so that support rollers 5 may be provided according to the mounting principle of an axle and also according to the mounting principle of a shaft.

In addition, the possibilities shown in FIGS. 19 and 20, of one support roller 5 in each tooth profile 3 or two support rollers in each second tooth profile 3, are purely exemplary. The number of support rollers 5, which is integrated into a tooth profile 3, is a function of the belt width and the type of use of the toothed belt. For example, arrangements of alternating two and three support rollers 5 per tooth profile 3 are also conceivable, wherein support rollers 5 may be arranged offset to one another. Arrangements are also possible, in which the number of support rollers is different from tooth profile 3 to tooth profile 3. It is clear that the invention is not limited to the embodiments shown in the figures, but instead modifications and uses of features shown in one embodiment are possible in another embodiment.

Figure 7:
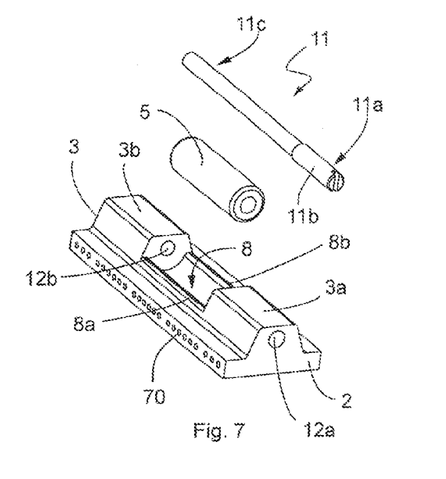
FIG. 7 shows the section of the toothed belt shown in FIG. 6 in a perspective exploded view.
Figure 8:
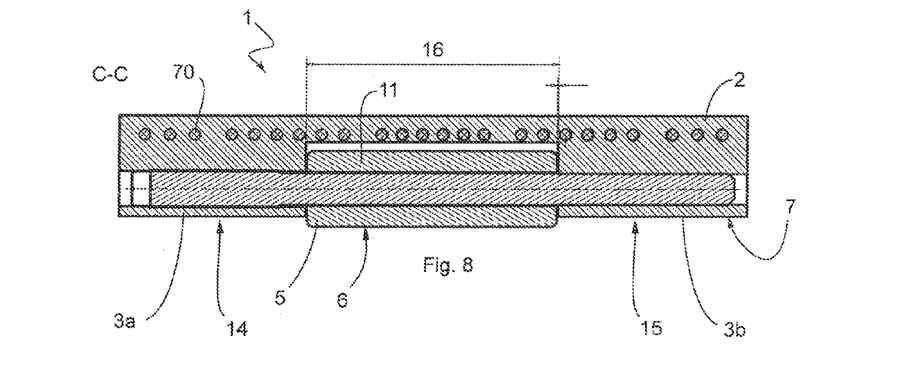
FIG. 8 shows a side view of the toothed belt along line C-C in FIG. 3 for a possible mounting of a support roller accommodated in the tooth profile.
Figure 9:
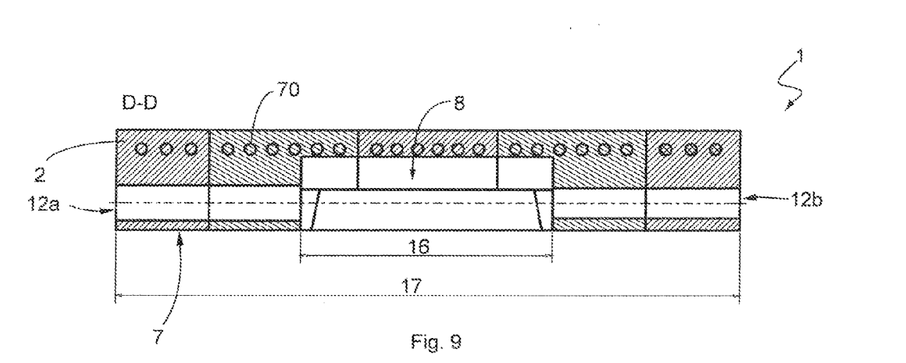
FIG. 9 shows a side view of the toothed belt along line D-D in FIG. 3 while omitting the support roller.
Figure 10:
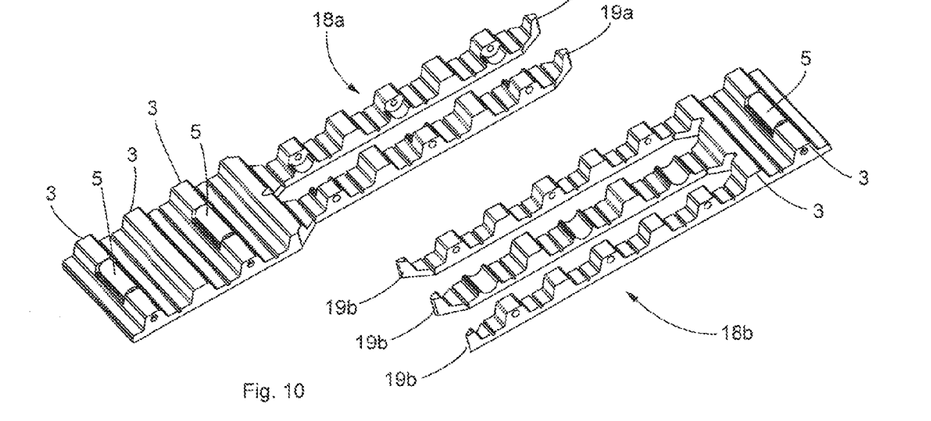
FIG. 10 shows in a perspective view the comb-like longitudinal ends of the toothed belt according to the invention corresponding to a stamped image visible in FIG. 3.
Figure 18:
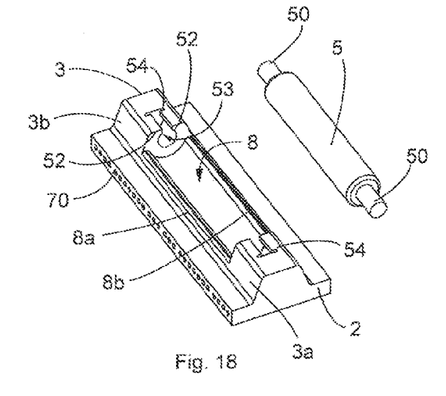
FIG. 18 shows the section of the toothed belt shown in FIG. 17 in a perspective exploded view.

As is further clear from FIGS. 7 and 18, support roller 5 has a cylindrical shape in the previously described embodiments. As an alternative to the cylindrical shape of support roller 5, a support roller 5' is shown schematically in FIG. 21, which is designed as convex in an axial section and is conceived of for the mounting principle of the axle. Naturally, the convex shape of support roller 5' may also be transferred to support rollers with shaft stumps 50, thus to the mounting principle according to a type of shaft. The barrel shape generates less friction and is less sensitive to wear at the edges, in contrast to cylindrical support rollers, wherein a combination is also possible which uses convex support rollers 5' and cylindrical support rollers 5 in one toothed belt 1.

In the top views of FIGS. 3 and 12, a stamped image 90 is clear which functions for developing an endless toothed belt, in that longitudinal ends 18a and 18b of toothed belt 1 are welded to one another. For this purpose, respective longitudinal ends 18a, 18b of toothed belt 1 have comb-like tongues or stamped fingers 19a and 19b designed complementary to one another, which are arranged engaging with one another and are welded to one another to form an endless belt (see FIG. 10, which applies accordingly for both embodiments). Stamped fingers 19a, 19b are formed during manufacturing by recesses which are designed into longitudinal ends 18a, 18b of the toothed belt. As is further clear in FIG. 3, stamped image 90 extends in longitudinal direction 4 of toothed belt 1 and across three tooth profiles 3 with support rollers 5. Stamped images with a greater or lesser longitudinal extension 91 are, however, also conceivable than those which are shown in FIG. 3. It is important with respect to the production process that a subsequent stamping and welding process is carried out on toothed belt 1 closed on itself. For this purpose, the position of the traction carriers or reinforcing strands 70 have to be "stamping friendly", which means that no reinforcing strands 70 are arranged running longitudinally in the region of a stamping line of stamped image 90 extending in longitudinal direction 4. This is also the reason why the distances between reinforcing strands 70 are designed irregularly, as is clear, for example, from FIGS. 3 and 12. Further, the cavities of recesses 8 have to be configured such that they are deformable and do not hinder the welding process.

Insofar as identical reference numerals are used in the different embodiments of the figures, these relate in each case to identical elements of components.

It is emphasized again in conclusion, that it is important for the invention that at least one support roller 5 is integrated in a tooth profile 3, wherein a respective support roller 5 protrudes past top face 7 of associated tooth profile 3 exclusively with a section 80 of the bearing surface 6 of support roller 5. Only by this section 80 does a respective support roller 5 protrude out of the cross section of a respective tooth profile 3 so that the function of the actual tooth profile 3 is guaranteed as previously. With respect to this, it is noted that a toothed belt 1 with a T-profile is shown in the figures. Such a toothed belt rides on the toothed gear via the tooth gaps in the belt. The tooth crown of the belt does not lie in the toothed gear. The amount of air present is greater than the projection of support rollers 5 protruding downward from the belt teeth, so that a completely normal standard toothed gear may be used. The AT profile, in contrast rides on the crowns of the teeth. In this case, the gap base of the toothed gear must be adapted so that a cylindrical section is made available in each second tooth gap into which section the support roller 5 immerses, insofar as each second tooth profile 3 is equipped with a support roller. For this reason, only whole numbers are permissible for the number of teeth of the toothed gear.

The previously described invention is naturally not limited to the embodiments described and depicted. It is clear in the embodiments shown in the drawings that numerous obvious modifications may be carried out by a person skilled in the art corresponding to the intended use, without exceeding the scope of the invention. The invention includes everything that is contained in the description and/or shown in the drawings, including that which deviates from the specific embodiments and is obvious for a person skilled in the art.

The invention claimed is:

1. A toothed belt for transporting objects, comprising:
   a strip-shaped belt body, which supports tooth profiles, which are molded on one side thereof and are arranged uniformly distributed in the longitudinal direction of the toothed belt,
   wherein at least one tooth profile has at least one recess in which a support roller is arranged, the bearing surface of the support roller protrudes past the top face of the associated tooth profile for supporting the toothed belt.

2. The toothed belt according to claim 1, wherein the at least one recess divides the associated tooth profile into tooth profile sections with respect to the width direction of the toothed belt, wherein the associated support roller of the recess is rotatably retained in the adjoining tooth profile sections of the associated tooth profile.

3. The toothed belt according to claim 1, wherein a respective support roller protrudes a maximum of one-third of its radius past the top face if the associated tooth profile.

4. The toothed belt according to claim 1, wherein a respective support roller is rotatably mounted via an axle fixed in the associated tooth profile.

5. The toothed belt according to claim 4, wherein a first longitudinal end of the axle is fixed in a tooth profile section of an associated tooth profile via a thread connection, and a second longitudinal end of the axle is fixed in a press-fit connection in the other tooth profile section of the associated tooth profile.

6. The toothed belt according to claim 1, wherein shaft stumps are molded on the ends on a respective support roller, each shaft stump functioning for rotatable mounting, wherein the tooth profile sections each have a snap-in connection for accommodation and rotatable mounting of an associated shaft stump.

7. The toothed belt according to claim 1, wherein the ratio of axial length of a respective support roller to belt width is at least 0.1 and at most 0.65.

8. The toothed belt according to claim 1, wherein the longitudinal ends of the toothed belt have comb-like stamped fingers designed complementary to one another, which define a predetermined stamped image and are arranged engaging with one another and are welded to one another to form an endless belt, wherein the stamped image extends in the longitudinal direction of the toothed belt across at least two tooth profiles with support rollers.

9. The toothed belt according to claim 1, wherein the belt body has longitudinal reinforcing strands, which run exclusively laterally adjacent to a respective support roller or also below a respective support roller.

10. The toothed belt according to claim 1, wherein the support rollers arranged in the recesses are arranged aligned behind one another in the longitudinal direction of the toothed belt.

11. The toothed belt according to claim 10, wherein at least one recess accommodating a support roller is designed in every second tooth profile of the toothed belt.

12. The toothed belt according to claim 1, wherein the support rollers arranged in the recesses of adjacent tooth profiles in the longitudinal direction of the toothed belt may be arranged offset to one another in the width direction.

13. The toothed belt according to claim 1, wherein at least one recess accommodating a support roller is designed in each tooth profile of the toothed belt.

14. The toothed belt according to claim 1, wherein at least one support roller is designed as convex when viewed in an axial section.

* * * * *